Figure 1:
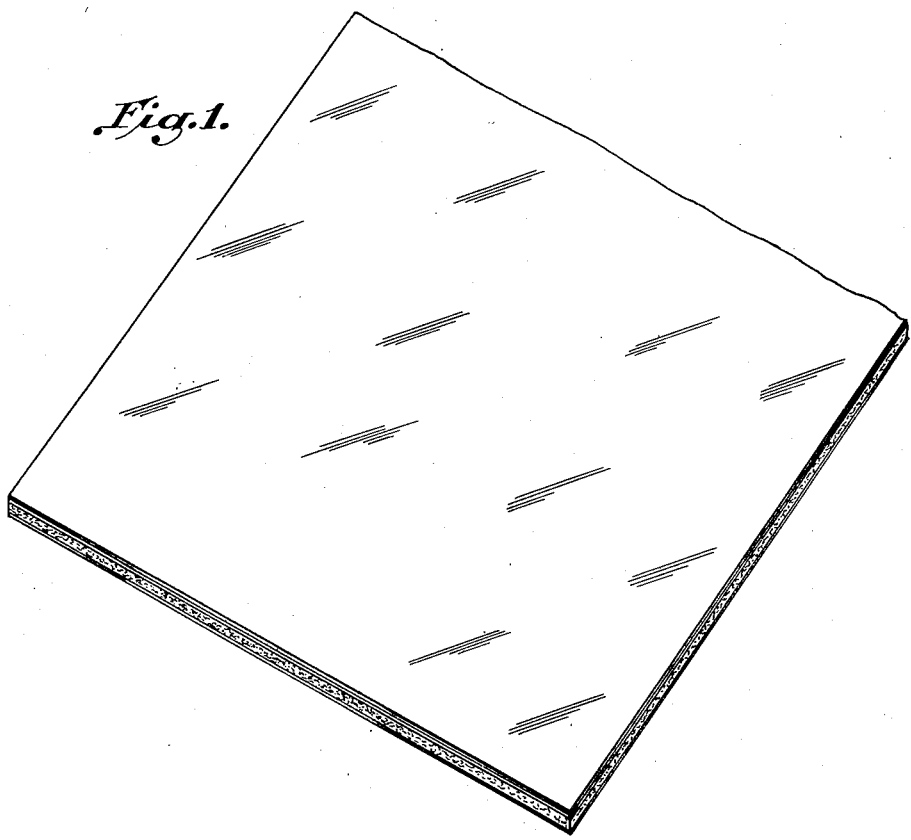
Figure 2:
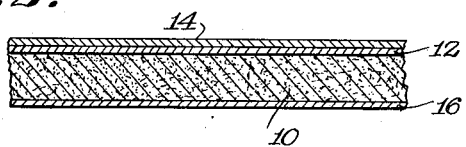

April 17, 1951     R. E. PARRY     2,549,516

STRUCTURAL UNIT AND METHOD OF MANUFACTURE

Filed April 6, 1946

INVENTOR.
ROBERT E. PARRY.
BY
Virgil C. Kline
ATTORNEY.

Patented Apr. 17, 1951

2,549,516

UNITED STATES PATENT OFFICE 2,549,516

STRUCTURAL UNIT AND METHOD OF MANUFACTURE

Robert E. Parry, Martinsville, N. J., assignor to Johns-Manville Corporation, New York, N. Y., a corporation of New York Application April 6, 1946, Serial No. 660,144

4 Claims. (Cl. 117—70)

This invention relates to decorative structural units, and is particularly concerned with the manufacture of low cost color coated and moisture resistant structural panels suitable for interior wall linings.

An object of the invention is that of providing smooth, durable, decorative and moisture resistant coatings for hydrated and hardened structural cement bodies.

The invention is particularly concerned with the problem of providing hydrated and hardened structural sheets of asbestos-hydraulic cement composition, with durable decorative and waterproof coatings. Colored structural sheets of this general type have been heretofore produced by incorporating pigments throughout the sheet structure, but this method involves an uneconomical use of pigment, and the product is not satisfactory for interior wall construction because its inherently rough surfaces collect dust and dirt and the color is changed by streaking and soiling. Use of fused ceramic coatings is not permissible because the heat required to set up such coatings injures the asbestos-cement base sheet, causing loss of strength, spalling and warping. Colored coatings have been heretofore proposed which incorporate as their principal constituents a soluble alkali silicate, a pigment and a metal oxide or silicate such as clay. Such compositions can be set up to a relatively durable, moisture resistant coating by heat hardening at temperatures of the order of 700–1000° F., but even these temperatures adversely affect the strength of the base sheet. No practical heat treatment of this type can impart complete moisture stability.

A particular object is to provide an economical method of developing smooth, decorative and durable moisture resistant coatings for strong fireproof structural sheets.

A specific feature of the invention consists in providing a hydrated and hardened fibro-cementitious base sheet with an exceptionally thin inorganic color sub-coat of fine grain and smooth texture, on which is superposed a transparent, smooth, washable and mar resistant finish coat. In this manner decorative color coats of suitable thinness and stretch characteristics to resist crazing and cracking, are rendered sufficiently durable and moisture and wear resistant by the superposed transparent finish or overcoat.

With the above objects and features in view, the invention consists in the improved composite decorative structural sheet and method of manufacture which are hereinafter described and more particularly defined by the accompanying claims.

In the following description reference will be made to the attached drawing, in which the single figure presents diagrammatically a magnified edge view superimposed on a perspective view, illustrating a structural fibro-cementitious base sheet having an inorganic color sub-coat and a transparent waterproof organic finish coat over one of its major surfaces.

The method of the present invention is designed to impart at low cost a washable, durable and decorative surface finish for large panels or structural sheets of asbestos-cement composition, or of mineral fiber reinforced hydrous calcium silicate, to adapt such sheets for use as interior wall panels. As illustrated in the drawing, the composite panels or structural slabs forming the finished article comprise a hydrated and hardened base unit 10 of fiber reinforced hydraulic cement composition; a thin pigment containing sub-coat 12 strongly adhering to the base sheet and comprising chiefly an inorganic silicate coating of low water solubility; and a final transparent top coat 14 which imparts moisture, chemical and stain resistance to the panel and which comprises chiefly an organic thermoplastic lacquer resin.

A green moist base sheet may be conditioned for application of the color sub-coat by subjecting the hydraulic cement component thereof either to normal air curing, or to steam curing treatment, depending on whether or not the base sheet incorporates finely divided silica as one of its ingredients. After curing the base sheet the surface which is to be coated should be sanded or otherwise treated to impart a smooth surface. The base sheets or panels may be molded as plain, smooth sheets, or they may have one surface grooved or scored to impart the effect of tile or block patterns.

A principal ingredient of the sub-coat is a soluble alkali silicate such as sodium silicate or potassium silicate. The subcoat is preferably applied as an aqueous suspension in which the alkali silicate is present as a solution of approximately 30–40° Bé. gravity, with the alkali oxide and silica present in the ratio of about 1:3.25 by weight. Another ingredient is a finely divided alkali resistant mineral pigment selected to impart a desired color to the product. Suitable pigments are titanium oxide, iron oxides, chromic oxide and ultra marine blue. The pigments may be extended by the use of inert fillers such as finely divided diatomaceous silica, finely divided calcium carbonate and fibrous talc (asbestine). The sub-coat may also incorporate small amounts of reactive material such as zinc oxide.

Another principal ingredient of the sub-coat comprises an aluminum silicate such as natural or calcined clay. Kaolinite type clays are preferred because they are of high purity, and in finely divided form are sufficiently reactive with the alkali silicates to impart characteristics of water insolubility to the heat hardened coating. Another advantage of employing kaolinite type clays is that their presence permits the development of a strong and tough sub-coat when using temperatures which lie within the range below 700° F. at which the strength of the base sheet is not adversely affected by the heat hardening treatment.

Suitable compositions for a sub-coat slurry for spray application are as follows:

|  | Per cent |
|---|---|
| Sodium or potassium silicate (alkali oxide-silica ratio—1–3.25) | 45–60 |
| Titanium oxide | 7.5–15 |
| Zinc oxide | 1.5–7.5 |
| Diatomaceous silica | 5–15 |
| Quartz silica | 1–5 |
| Clay | 5–15 |
| Water | 10–20 |

Suitable pigment mixture for a light green coating would be:

|  | Per cent |
|---|---|
| Titanium oxide | 5–10 |
| Chrome oxide (green) | 1–10 |

In making up the formula for application in liquid paint form as by brushing, dipping or spraying, more uniform dispersion of the solid ingredients in the aqueous suspension is obtained by the use of a small amount of a wetting and dispersing agent such as sulfonated castor oil. The sub-coat is preferably applied by spraying to provide a film which after heat cure has a thickness of .001–.0025 inch. Color coats of this thickness are ample to impart durable decorative color finishes when they are further protected by transparent moisture resistant finish coats; and such thin sub-coats are characterized by ample toughness and flexibility to withstand wide and rapid temperature changes without crazing or separation from the base sheet. The heat curing of the film is preferably carried out at a temperature not substantially exceeding 600° F. in a drying and heating cycle of short duration. It is advisable that the heat curing or baking temperature should be at least 450° F. to impart the desired degree of hardness and water insolubility. Also it is desirable that the baking temperature shall not exceed 700° F. because above this temperature the bond of the sub-coat to the base sheet is weakened, and the strength of the base sheet itself is adversely affected.

After application and heat curing or baking of the sub-coat, a protective transparent top coat is applied. A suitable material for use in the top coat is a transparent vinyl-chloride-vinyl-acetate copolymer resin lacquer. The preferred top coating lacquer comprises a maleic modified vinylite copolymer resin. This type of lacquer is characterized by high water resistance, maximum resistance to the effects of alkalis in the underlying sub-coat, grease resistance and chemical resistance.

A general type formula for the top coat is as follows:

|  | Per cent |
|---|---|
| Maleic modified vinyl-acetate-vinyl-chloride copolymer | 10–20 |
| Plasticizer (for example dibutylphthalate) | 3.0–7.5 |
| Solvents | 72.5–87 |

Suitable solvents are mixtures of aromatic hydrocarbons and low boiling ketones. For example, a suitable solvent may comprise 17% methyl ethyl ketone, 17% methyl isobutyl ketone and 45.5% Solvesso #2.

A top coat of the type given in the above formula develops, when dry, a glossy finish. In many cases it is desirable to use a top coat which dries to a flat or semi-gloss finish. These low gloss finishes are attractive in appearance and have the added advantage of hiding any small surface imperfections in the base sheet or in the color sub-coat. To impart a low gloss finish the top coat composition should be modified by incorporating small amounts of conventional lacquer flatting agents such as aluminum or zinc stearate, finely divided diatomaceous earth, finely divided silica gel particles and the like, in the proportions of 1–6% by weight of flatting agent based on the weight of the clear vinyl lacquer. A big advantage of using a maleic modified vinyl copolymer resin is that it may be cured either by air drying or baking. Vinyl copolymer resin top coats of the type described afford exceptional resistance to moisture penetration, and are sufficiently resistant to alkali and acid staining agents and to fats, greases and the like, so that they provide permanent mar and stain resistant transparent washable finish coats for color sub-coats.

That major surface of the base sheet 10 to which no color coat is applied is preferably treated to prevent excessive absorption of moisture and possible warpage of thin sheets, by applying thereto a waterproofing coat 16. There are many kinds of waterproofing materials which are suitable for this purpose, as, for example, vinyl resin lacquers, chlorinated rubber solutions, asphalt cut-backs, other waterproofing resin solutions, aluminum paint, etc.

Since many variations may be made from the illustrative details given, without departing from the scope of the invention, it is intended that the invention should be limited only by the terms of the claims interpreted as broadly as consistent with novelty over the prior art.

What I claim is:

1. A composite decorative panel sheet comprising, a hydrated and hardened fibro-cementitious base, a thin sub-coat of .001–.0025 inch thickness comprising a heat hardened reaction product of an alkali resistant pigment, a soluble alkali silicate and finely divided clay, and a finishing coat comprising a transparent moisture, chemical and stain resistant maleic modified vinyl-acetate-vinyl-chloride copolymer.

2. A composite structural unit comprising a base sheet of hydrated and hardened fiber reinforced hydraulic cement composition, said base sheet having a heat hardened decorative color sub-coat of .001–.0025 in. thickness formed in situ on a surface thereof and comprising a nonvitreous hydrate of an alkali oxide-alumina-silica complex, and an outer coat formed in situ by drying and hardening a solvent reduced plasticized vinyl-chloride-vinyl-acetate copolymer resin lacquer.

3. A method of imparting a decorative, smooth and waterproof surface to a hydrated and hardened hydraulic cement surface which comprises, applying thereto a thin color sub-coat of not to exceed .0025 inch thickness by drying and heat curing in situ a film suspension of finely divided clay and a mineral pigment in an aqueous sodium silicate solution of high silica content, and applying over the sub-coat a thin transparent finish coat by drying and heat hardening a solvent reduced film of plasticized vinyl-chloride-vinyl-acetate copolymer resin.

4. The method of imparting a decorative, smooth and waterproof surface to a hydrated and hardened fiber-cement base sheet which comprises, developing a thin color sub-coat of .001–.0025 inch thickness by drying and heat curing at a temperature of 450–700° F. an aqueous film suspension containing pigment, soluble alkali silicate and finely divided kaolinitic clay, applying to the heat cured silicate sub-coat a transparent finish coat comprising solvent reduced maleic modified vinyl chloride-vinyl acetate copolymer resin, and drying and heat curing the said finish coat.

ROBERT E. PARRY.

REFERENCES CITED

The following references are of record in the file of this patent:

UNITED STATES PATENTS

| Number | Name | Date |
|---|---|---|
| 2,128,961 | Patterson | Sept. 6, 1938 |
| 2,307,629 | MacIldowie | Jan. 5, 1943 |
| 2,347,684 | Hatch et al. | May 2, 1944 |
| 2,350,030 | Greider | May 30, 1944 |
| 2,354,351 | Schuetz | July 25, 1944 |
| 2,372,284 | Marc | Mar. 27, 1945 |

FOREIGN PATENTS

| Number | Country | Date |
|---|---|---|
| 473,513 | Great Britain | 1937 |

OTHER REFERENCES

Doolittle et al.: "New Vinyl Resin for Air-Dry and Low-Bake Coatings," pgs. 9–11, 40–42 (article appearing in Paint, Oil and Chem. Review, Apr. 6, 1944.